United States Patent
Zaruba

[15] 3,638,504
[45] Feb. 1, 1972

[54] VARIABLE PITCH LINEAR ACTUATOR WITH VARIABLE THRUST

[72] Inventor: Wenzel Zaruba, East Paterson, N.J.
[73] Assignee: Textol Systems Inc., Meadow Lane, N.J.
[22] Filed: Aug. 19, 1969
[21] Appl. No.: 851,421

[52] U.S. Cl..................................................74/25
[51] Int. Cl...........................................F16h 21/16
[58] Field of Search......................................74/25

[56] References Cited

UNITED STATES PATENTS 2,578,026  12/1951  Taylor..................................74/25
3,475,972  11/1969  Steibel..................................74/25

*Primary Examiner*—Milton Kaufman
*Assistant Examiner*—Wesley S. Ratliff, Jr.
*Attorney*—Caesar, Rivise, Bernstein & Cohen

[57] ABSTRACT

A linear actuator which has a housing with a longitudinally extending cylindrical bore and a plurality of wheels mounted in the housing. A shaft is rotatably and slidably mounted in the bore with the wheels being disposed adjacent the bore and urged against the shaft for controlling the movement of the shaft with respect to the housing. The wheels are urged against the shaft by a pressure controlled diaphragm. Thrust of the linear actuator can therefore be varied from a remote source.

10 Claims, 7 Drawing Figures

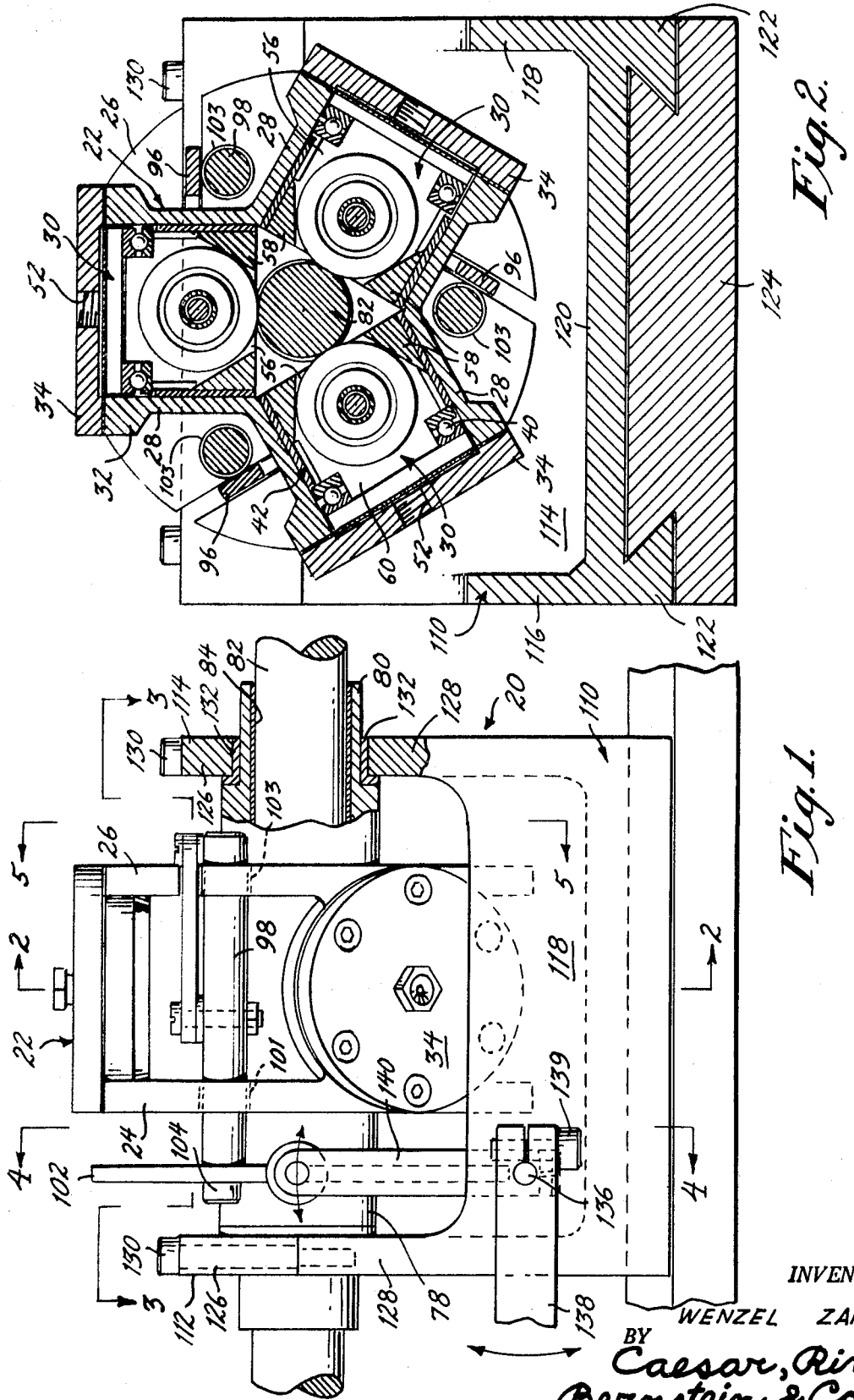

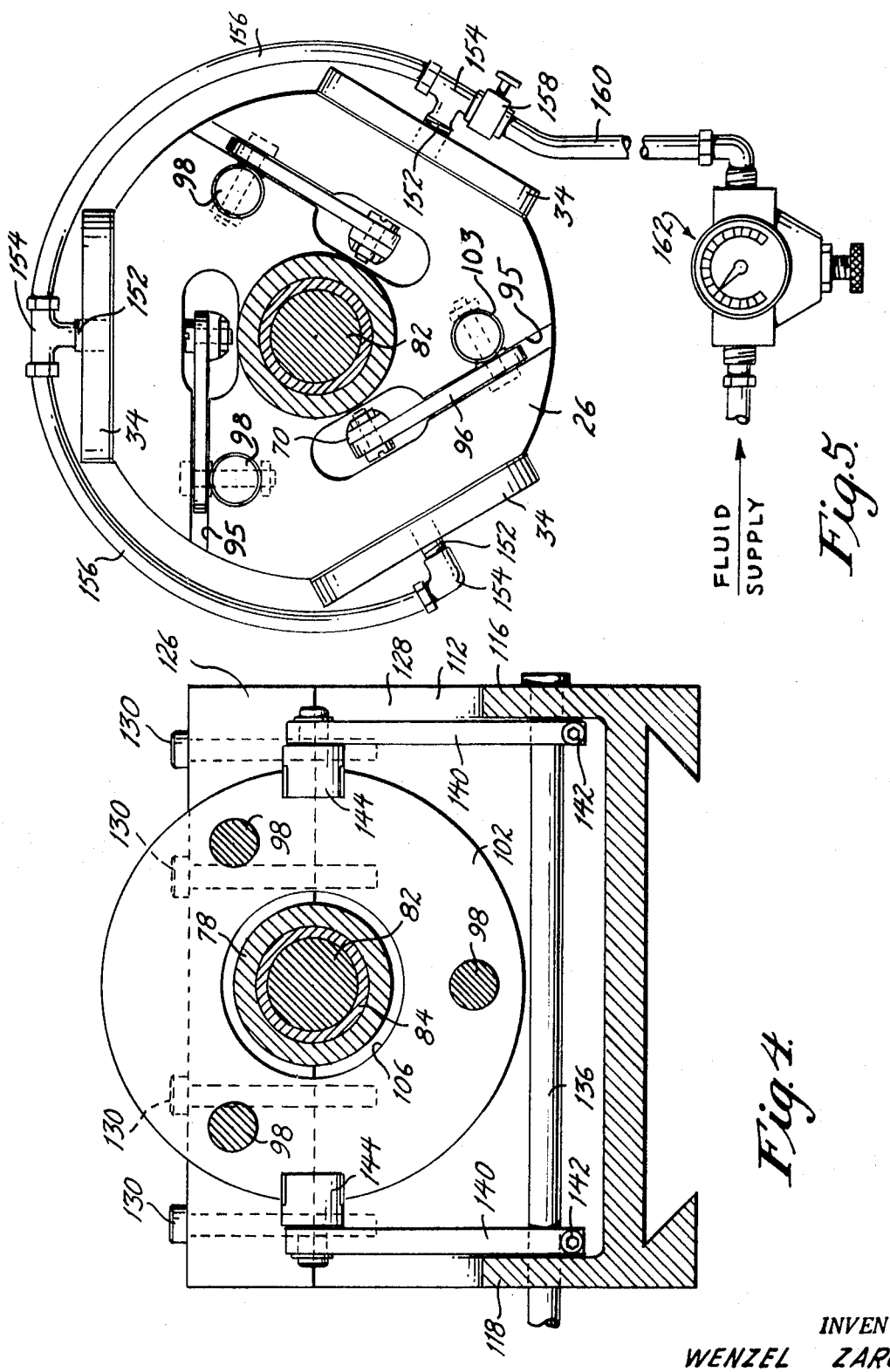

VARIABLE PITCH LINEAR ACTUATOR WITH VARIABLE THRUST

This invention relates generally to linear actuators and more particularly to a variable-pitch linear actuator with variable thrust.

This invention represents an improvement over the variable-pitch linear actuator disclosed in my copending application Ser. No. 669,447, filed Sept. 21, 1967 now U.S. Pat. No. 3,473,393. Although the aforementioned copending application discloses a variable-pitch linear actuator which has proved suitable forth purposes designed, the present invention disclosed herein adapts the variable-pitch linear actuator disclosed in the aforementioned application for high-thrust applications where there are substantial idling periods for variable-thrust applications as well as various other applications.

In order to obtain thrust with a variable-pitch linear actuator, it is necessary that the wheels be suitably urged against the shaft extending through the housing of the linear actuator. That is, the thrust is determined by the frictional engagement between the wheels and the shaft. As the frictional engagement increases, the resistance to slippage of the shaft longitudinally with respect to the housing of the linear actuator is increased.

Thus, in order to obtain high thrust, the wheels must be urged against the shaft by high pressure. Consequently, as the shaft rotates within the housing, the wheels are gradually worn down. Where the thrust cannot be varied, the wheels are worn down even where the linear actuator is in an idling position. That is, the pitch of the wheels of the linear actuator are so disposed that the linear actuator does not move along the shaft as the shaft rotates with respect to the housing.

It is therefore an object of the invention to provide a new and improved variable-pitch linear actuator with variable thrust.

Another object of the invention is to provide a new and improved variable-pitch linear actuator in which the pressure of the wheels against the shaft can be varied.

Another object of the invention is to provide a new and improved linear actuator in which the pitch can be varied even where the housing is rotating about a fixed shaft.

These and other objects of the invention are achieved by providing a linear actuator having a housing with a longitudinally extending cylindrical bore and a plurality of wheels mounted in the housing. A shaft is rotatably and slidably mounted in the bore. The wheels are each disposed adjacent the bore. Means for urging the wheels against the surface of the shaft for controlling movement of the housing with respect to the shaft as the shaft is rotated with respect to the housing are also provided. The means for urging include members for varying the pressure applied to the wheels. The members are responsive to a remotely controlled device so that the thrust of the linear actuator may be varied from a remote source.

Other objects and many of the attendant advantages of this invention will be readily appreciated as the same becomes better understood by reference to the following detailed description when considered in connection with the accompanying drawings wherein:

FIG. 1 is a side elevational view of the variable-pitch linear actuator with variable thrust embodying the invention;

FIG. 2 is a sectional view taken along the line 2—2 in FIG. 1;

FIG. 4 is a sectional view taken along the line 4—4 in FIG. 1;

FIG. 5 is a sectional view taken along the line 5—5 in FIG. 1;

Referring now in greater detail to the various figures of the drawing wherein similar reference characters refer to similar parts, a variable-pitch linear actuator with variable thrust embodying the invention is shown generally at 20 in FIG. 1.

Figure 7:
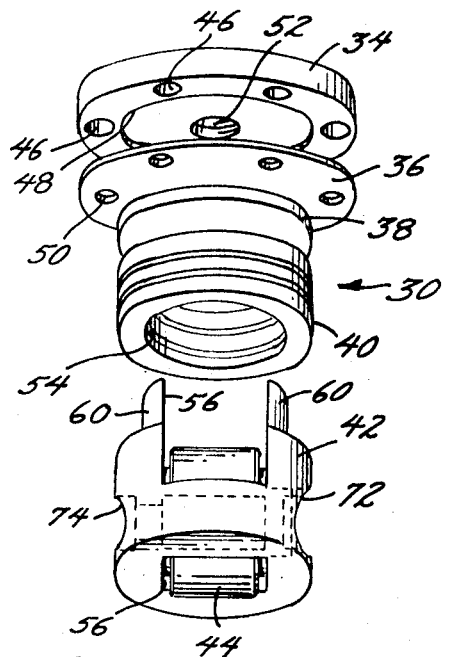
FIG. 7 is an exploded perspective view of the parts utilized in the linear actuator for mounting the wheels in the housing.

As best seen in FIGS. 1 and 2, the variable pitch linear actuator includes a housing 22 having a pair of circular flanges or end walls 24 and 26. Housing 22 further includes between walls 24 and 26, three radially extending generally cylindrical inner walls 28. The walls 28 include therein cylindrical radially extending bores. Walls 28 are integral with walls 24 and 26. The bores within the walls 28 are adapted to house wheel bearing assemblies 30 (FIG. 7).

As best seen in FIG. 2, each of the walls 28 includes an enlarged or flared end portion 32. As best seen in FIG. 7, the wheel bearing assembly 30 basically comprises a cover plate 34, a diaphragm 36, a cylindrical metal disc 38, a thrust bearing 40, a yoke 42, and a wheel 44.

The cover plate 34 is basically cylindrical and includes a plurality of openings 46 which extend through the cover plate and which are disposed about the periphery hereof. The cover plate 34 further includes a shallow cylindrical recess 48 in the inside surface thereof.

The diaphragm 36 is suitably comprised of a flexible material and includes a plurality of openings 50 which are aligned with openings 46 of cover plate 34. As best seen in FIG. 2, each of the cover plates 34 are suitably secured to end portions 32 of walls 28 of the housing. The cover plate is secured to the end portion 32 by suitable fasteners which extend through openings 46 and through openings 50 of the diaphragm which is secured between the end portion 32 and the cover plate 34. Each of the cover plates 34 further includes a threaded cylindrical opening 52 at the center thereof.

The openings 52 enable the intake of fluid to apply pressure to diaphragm 36. The disc 38 is provided adjacent the diaphragm 36 to enable the transfer of the force from the diaphragm 36 to the thrust bearing 40.

The thrust bearing 40 includes a cylindrical opening 54 for reception of the upper portion of yoke 42. The yoke 42 is generally cylindrical and includes a rectangular slot or opening 56 which extends through the center of yoke 42. The thrust bearings 40 each include ball bearings between the upper and lower races thereof so that rotation of the yokes is enabled even though the discs 38 bear heavily against the upper surface of the thrust bearings.

As best seen in FIG. 2, slots 56 in the yokes 42 are generally rectangular and include a tapered end portion as a result of wedge-shaped section 58 being provided at the lowermost end of the yoke 42.

Each yoke 42 further includes a pair of projections 60 which are generally semicylindrical and which extend into openings 54 of the thrust bearing 40.

Figure 3:
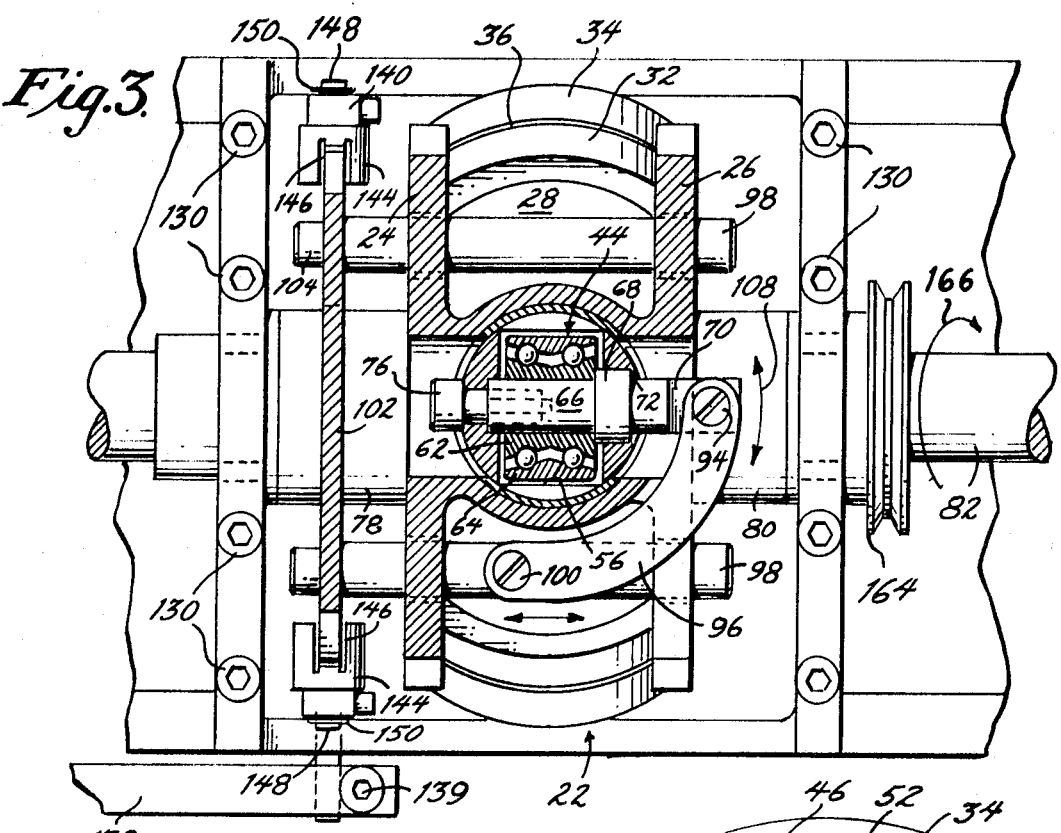
FIG. 3 is a sectional view taken along the line 3—3 in FIG. 1.

As best seen in FIG. 3, the wheels 44 basically comprise an inner race 62 and an outer race 64 which are separated by ball bearings. The outer race 64 rotates about the inner race 62 which is secured to cylindrical member 66. Cylindrical member 66 includes an enlarged cylindrical portion 68 which is integrally connected to lever arm 70.

As best seen in FIG. 7, the yoke 42 includes a transversely extending opening 72 which is cylindrical and which accommodates the enlarged portion 68 of the cylindrical member 66. An opening 74 is provided in the diametrically opposed portion of the yoke 42 to accommodate a threaded fastener 76 which is axially secured to cylindrical member 66.

As best seen in FIG. 3, the end walls 24 and 26 include outward longitudinally extending projections 78 and 80. Projections 78 and 80 of the housing each include a longitudinally extending bore which are aligned with each other and in which shaft 82 in rotatably and slidably mounted.

As best seen in FIG. 1, the projections 78 and 80 each include bronze bushings 84 on the surface of the bore. The bushings facilitate rotation and slidability of the shaft 82 within the bore.

Figure 6:
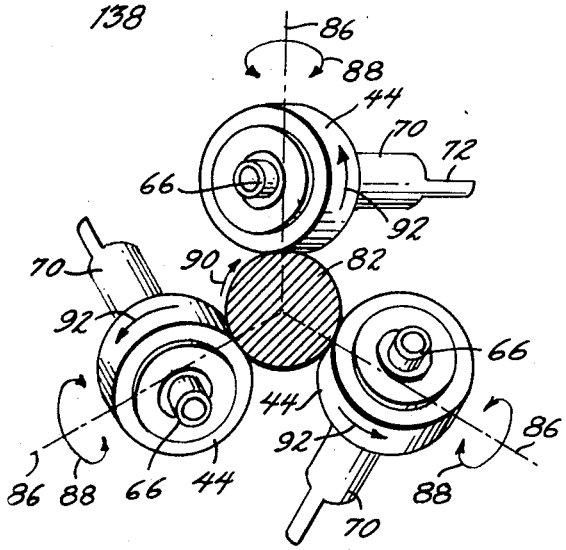
FIG. 6 is a diagrammatic perspective view of the wheels of the linear actuator contacting the shaft to illustrate the principle utilized in moving the linear actuator with respect to the shaft.

As best seen in FIG. 6, wheels 44 are each urged against the shaft 82. FIG. 6 illustrates the principle by which the linear actuator is moved along the shaft 82. For purpose of clarity, the axis 86 of each of the wheel assembly bores of each of the radially extending walls 28 is shown in phantom at 86 in FIG. 6.

It should be noted that each of the wheel bores are angularly separated or spaced 120° from each other and extend radially from the center of he shaft 82 and are perpendicular to the axis of shaft 82. In addition to the outer race of the wheels 44 being rotatable about the axis through cylindrical member 66, the planes of the wheels are rotatable in the direction of arrows 88 about the axes 86.

As will hereinafter be seen, the lever members 70 which are secured to each of the wheels 74 are linked together to insure that the wheels 44 are rotated about axis 86 substantially the same amount. As shaft 82 rotates in the direction of clockwise arrow 90, the outer races of the wheels 44 are moved in the direction of arrows 92. Thus, depending on the pitch of the plane through wheels 44 with respect to the axis of shaft 82, the shaft moves either towards the viewer or away from the viewer as shown in FIG. 6. If, however, the planes of the wheels are perpendicular to the axis of shaft 82, the shaft 82 does not move longitudinally with respect to the wheels 44 even though the shaft continues to rotate.

In the arrangement shown in FIG. 6 wherein the pitch of each of the wheels 44 with respect to the shaft 82 is as shown, the rotation of shaft 82 in the direction of arrows 90 causes the shaft to be moved towards the viewer. As the shaft rolls with the wheels 92, the wheels each move along a helical path on the surface of the shaft. This movement of the wheels causes the shaft to be moved linearly or longitudinally with respect to the wheels 44.

Each of the lever arms 70 includes a flattened portion 72 having a threaded opening therein for receipt of a shoulder screw 94. Secured to the flattened portions 72 of each of the lever arms are arcuately shaped links 96 which are pivotably secured to the flattened portions 72 of the lever arms by the shoulder screws 94.

The opposite ends of links 96 are pivotably connected to a bar 98 by a shoulder screw 100. Each of the bars 98 are fixedly secured to a circular plate 102. The bars 98 are secured to plates 102 by suitable fasteners 104. As best seen in FIGS. 1 and 5, the bars 98 are slidably mounted in openings 101 and wall 24 and openings 103 in wall 26. The links 96 and lever arms 70 extend through slotted openings 95 in wall 26.

As best seen in FIG. 4, plate 102 includes a circular opening 106. The opening 106 is larger than the outside diameter of the projection 78 and is therefore telescoped thereover. Plate 102 controls the pitch of the wheels 44 as a result of the securement to the lever arms 70 via the bars 98 and links 96. Lever arm 70 thus rotates in the directions of arrows 108 in FIG. 3 in accordance with the movement of plate 102 along projection 78. Thus, when plate 102 is moved towards the wall 24, the lever arms 70 are rotated in a counterclockwise position as seen in FIG. 3. When plate 102 is moved away from wall 24, the lever arm 70 moves in the clockwise direction as shown in FIG. 3.

As best seen in FIGS. 1 and 2, the housing 22 of the linear actuator is supported by a saddle 110. Saddle 110 basically comprises a pair of rectangular end walls 112 and 114 which are vertically disposed and are spaced by a pair of rectangular side walls 116 and 118. The sidewalls 116 and 118 are also vertically upstanding and with walls 112 and 114 form a rectangular saddle having a lower horizontally disposed wall 120 which extends between the four vertically standing walls. The saddle further includes a pair of triangularly shaped depending projections 122 which depend below the bottom wall 120.

The saddle is supported by a slide 124 which includes a dovetailed upper surface which fits between the projections 122.

It can therefore be seen that the saddle 120 is adapted to slide longitudinally along the slide 124 and is held in place by projection 122 which fits into the dovetailed surface of the slide 124.

The cylindrical projections 78 and 80 of the housing 22 project into openings provided in walls 112 and 114 of the saddle 110. As best seen in FIG. 4, each of the walls 112 and 114 include an upper portion 126 and a lower portion 128. The portions 126 and 128 are secured together by elongated threaded fasteners 130 which extend vertically through the walls 126 and are threadedly secured in vertically extending threaded openings in the lower portion 128 of wall 112. As best seen in FIG. 1, the projections 78 and 80 are each reduced at the ends thereof and include brass bushings 132 on the outer surface thereof so that when the upper portion and the lower portion 126 and 128, respectively, of the walls 112 and 114 are loosely secured, the housing may rotate therein. However, when the fasteners 130 are tightly secured, the housing is prevented from rotating within the openings provided in the walls 112 and 114 because the openings therein are made smaller.

As best seen in FIGS. 1 and 4, an elongated pin 136 is rotatably mounted in and extends transversely to walls 116 and 118 of saddle 110. A lever arm 138 is secured to pin 136 by a suitable fastener 139 which extends transversely through the bifurcated end of the lever member 138. The end of the lever member 38 includes a pair of transversely extending openings which are aligned with each other about a longitudinally extending end slot which forms a pair of end tines. Tightening fastener 139 secures lever member 138 to pin 136.

As best seen in FIG. 4, secured to pin 136 within walls 118 and 116 are a pair of linking bars 140. The linking bars 140 each include a bifurcated end similar to the end of lever member 138 and are secured to the pin 136 by suitable fasteners 142. Secured at the other end of the linking bars 140 are fork members 144. As best seen in FIGS. 3 and 4, the fork members 144 are generally cylindrical and include a pair of vertically extending rectangular slots, the surfaces of which are lined with bronze bushings 146. The plate 102 extends into the rectangular slots in the ends of the fork members 144 and the bushings 146 enable the plate 102 to rotate therein.

The fork members 144 include a narrowed cylindrical stem 148 which is axially aligned with the forked portion of the fork member 144. The narrow portions 148 extend through openings provided therefor in the ends of each of the linking bars 144. Each of the stems 148 includes an annular groove at the end thereof for reception of a spring locking clip 150. The fork members 144 are therefore rotatable about their axes within the linking bars 140.

As best seen in FIG. 5, connected to each of the cover plates 34 are inlet nozzles 152 which are threadedly engaged in openings 52 of cover plates 34. The nozzles 152 are in turn connected to piping accessories 154 which are connected by pipes 156 to enable the pressure in each of the bores or the wheels 44 to be at equal pressure. Pipes 156 and pipe accessories 154 are connected via an inlet valve 158 and piping 160 to a pressure regulator 162. The pressure regulator 162 is connected to a source of fluid supply. The fluid supply may take the form of either compressed gas or liquid.

As best seen in FIG. 3, the housing 22 may include a pulley 164 which is secured to the outer surface of the housing 80. Pulley 164 is optionally provided where the housing 20 is mounted to rotate and the shaft 82 is stationary. In this mode of use, the pulley 164 is connected via a pulley strap to a source of motive force such as a motor.

In operation, the variable-pitch linear actuator with variable thrust is usable in either one of two modes. In the first mode, the housing 22 of the linear actuator is stationarily mounted with respect to the saddle 110. That is, the fasteners 130 are tightened to a degree which causes the projections 78 and 80 to be fixedly secured within the openings in walls 112 and 114 of the saddle.

In this first mode, the shaft 82 is rotated about its axis in order to cause movement of the linear actuator 20 along the shaft. Thus, assuming shaft 82 is rotated in the direction of arrow 166 in FIG. 3, the linear actuator is moved along shaft 82 either to the left or to the right or remains fixed with respect to the shaft in accordance with the pitch of wheels 44 with respect to the shaft. That is, as shown in FIG. 3, the plane of the wheels 44 are perpendicular to he longitudinal axis of shaft 82. Accordingly, the linear actuator does not move with respect to the shaft along the length thereof irrespective of the speed of rotation of the shaft 82. In this position, the variable-pitch linear actuator is in an idling position.

However, if the variable-pitch linear actuator is to be moved to the left as seen in FIG. 3, the plate 102 has to be moved to the left as seen in FIG. 3. Accordingly, lever arm 138 is pivoted counterclockwise, as seen in FIG. 1, about the axis of pin 136. Pin 136 is therefore similarly rotated and causes linking bars 140 to also be moved in a counterclockwise direction about the axis of pin 136 which causes the plate 102 to be moved towards wall 112. When plate 102 is moved towards the left, the bars 98 are also drawn to the left as they slide within the openings provided therefor in walls 24 and 26. The movement of bars 98 draws the arcuate linking members 96 which cause the wheels 44 to be pivoted in a clockwise direction as seen in FIG. 3. The planes of each of the wheels 44 are therefore rotated about the radially extending axis 86. The more that the plate 102 is moved to the left, the greater is the pitch of the wheels with respect to the shaft.

It should also be noted that the larger the pitch of the wheels with respect to the axis of the shaft 82, the faster that the linear actuator moves along the shaft. That is, the pitch of the wheels with respect to the axis of the shaft when the plane of the wheels is perpendicular to the axis of the shaft is 0°. Thus, as the plane is rotated from the perpendicular position, the pitch of the wheels is increased.

It can therefore be seen that when shaft 82 rotates in the direction of arrow 166 in FIG. 3, the movement of the indexing plate 102 to the left of the position shown in FIG. 3 causes linear movement of the housing 22 to the left along shaft 82. Conversely, positioning the plate 102 to the right of the position shown in FIG. 3 causes the linear actuator housing 22 to move to the right along shaft 82.

As best seen in FIG. 1, the shaft 82 and slide 124 are both elongated. The saddle 110 rides along the slide 124 to prevent rotation of the housing 22.

Where the linear actuator is put into its idling position with the wheels perpendicular to the axis of the shaft 82, and the pressure being applied by the regulator 162 via the piping 160 and 156 to each of the wheel bores is high, it is desirable to reduce the pressure in the bores so that the wheels are not worn out while the linear actuator is idling. Accordingly, by opening valve 158, the pressure in each of the wheel bores is reduced thereby relieving the pressure between the wheels 44 and the shaft 82.

In a second mode of operation, the linear actuator can be moved along shaft 82 by rotation of the housing 22 of the linear actuator and fixing the shaft in a stationary position.

In this second mode of operation, the fasteners 130 are loosened so that the projections 78 of housing 22 are able to rotate within walls 112 and 114.

Also, prior to the rotation of the housing, it is necessary to disconnect piping 160 from the valve 158. The fluid valve 158 retains the desired pressure in each of the wheel bores of the housing 22. A motive force such as a motor is secured to the saddle 110 with the shaft of the motor being connected to the pulley 164 by a pulley belt. As the housing 22 rotates, the plate 102 moves through the slots provided in each of the forks 144. As best seen in FIG. 2, the saddle 110 is so shaped that the housing is rotatable about the shaft without hitting the sidewalls 116 and 118 of the saddle.

Where the shaft 82 is stationary and housing 22 rotates in a counterclockwise direction as seen in FIG. 2 or a clockwise direction as seen in FIG. 4, the housing is fixed longitudinally with respect to the shaft when the wheels are in the position shown in FIG. 3. However, by movement of the plate 102 to the left with respect to the position shown in FIG. 3, the linear actuator housing moves to the right along shaft 82. If the plate 102 is moved to the right of the position shown in FIG. 3, the linear actuator moves to the left. Conversely, if the linear actuator were rotated in the opposite direction about the shaft 82, movement of the plate 102 to the right causes longitudinal movement of the linear actuator to the right and movement of the plate 102 to a position to the left of the position shown in FIG. 3 causes movement of the linear actuator to the left along shaft 82.

It can therefore be seen that a new and improved linear actuator embodying the invention has been shown. The pitch of the wheels can be varied by rotating the lever arm 138 which causes rotation of the plane of the wheels 44 and accordingly enables the variable-pitch linear actuator to either be moved in one of two directions along the shaft as it rotates. The linear actuator is also able to idle as the shaft 82 rotates. Moreover, the rate of speed of the movement of the linear actuator can be varied in accordance with the amount of the angle of the plane of the wheels with respect to the plane when it is in a position normal to the axis of shaft 82.

In addition, the thrust of the actuator can be varied by the pressure regulator 162 which changes the pressure in the wheel bores of the housing. When the pressure is increased, the thrust is increased) proportionally. Accordingly, where high thrust is required, the pressure in each of the bores can be substantially increased. Also, where low thrust is all that is necessary, the pressure in the bores can be reduced and thereby reduce wear of the wheels 44.

Without further elaboration, the foregoing will so fully illustrate my invention that others may, by applying current or future knowledge, readily adapt the same for use under various conditions of service.

What is claimed as the invention is:

1. In a linear actuator having a housing with a longitudinally extending cylindrical bore and a plurality of wheels in said housing, a shaft, said shaft being rotatably and slidably mounted in said bore, means for urging said wheels each being disposed adjacent said bore, means for urging said wheels against the surface of said shaft for controlling movement of said housing with respect to said shaft as said shaft is rotated with respect to said housing, said means for urging including means for simultaneously varying the pressure applied to each of said wheels, said pressure-varying means being responsive to an externally controlled device so that the thrust of said linear actuator may be varied from an external source as said shaft rotates with respect to said housing.

2. The invention of claim 1 wherein said housing further includes radially extending bores for each wheel, said wheels being rotatable within said bores about the axis of said bore.

3. The invention of claim 1 wherein said means for varying the pressure applied to said wheels includes a diaphragm for each wheel, said diaphragms being connected to a source of fluid pressure, said diaphragms urging said wheels against said shaft in accordance with the pressure applied against said diaphragms.

4. The invention of claim 1 wherein said linear actuator further includes a longitudinally movable plate, said plate being connected to each of said wheels, said wheels being rotated about an axis perpendicular to said shaft in accordance with the movement of said plate.

5. In a linear actuator having a housing with a longitudinally extending cylindrical bore and a plurality of wheels mounted in said housing, a shaft, said shaft being rotatably and slidable mounted in said bore, said wheels each being disposed adjacent said bore, a longitudinally movable plate, said plate being connected to each of said wheels via an elongated bar and an arcuate link, said wheels each having a lever member for varying the pitch of said wheels, said lever members each being connected to said arcuate link so that said wheels are rotated about an axis perpendicular to said shaft in accordance with the movement of said plate, means for urging said wheels against the surface of said shaft for controlling movement of said housing with respect to said shaft as said shaft is rotated with respect to said housing, said means for urging including a member for varying the pressure applied to said wheels, said member being responsive to a remotely controlled device so that the thrust of said linear actuator may be varied from a remote source.

6. The invention of claim 5 wherein said housing includes a pair of end walls, said walls having a plurality of openings, said elongated bare each being slidably mounted in said openings to move with said plate.

7. In a linear actuator having a housing with a longitudinally extending cylindrical bore and a plurality of wheels mounted in said housing, a shaft, said shaft being rotatably and slidably mounted in said bore, said wheels each being disposed adjacent said bore, a longitudinally movable plate, said plate being connected to each of said wheels, said wheels being rotated about an axis perpendicular to said shaft in accordance with the movement of said plate, means for urging said wheels against the surface of said shaft for controlling movement of said housing with respect to said shaft is rotated with respect to said housing, said means for urging including a member for varying the pressure applied to said wheels, said member being responsive to a remotely controlled device so that the thrust of said linear actuator may be varied from a remote source, said housing further including a pair of axially extending projections, said projections adapted to be rotatably mounted in a supporting saddle so that said housing may be rotated while said shaft remains stationary to provide linear motion to said housing along said shaft.

8. The invention of claim 7 wherein said saddle includes a pivotable lever member and a pair of linking bars, each of said linking bars having a pivotable forked member secured thereto, said for members being slidably mounted about the periphery of said plate so that rotation of said lever member causes movement of said plate for varying the pitch of said wheels.

9. In a linear actuator having a housing with a longitudinally extending cylindrical bore and a plurality of wheels mounted in said housing, a shaft, said shaft being rotatably and slidably mounted in said bore, said wheels each being disposed adjacent said bore, said wheels each being pivotable about an axis perpendicular to the axis of said shaft, means for urging said wheels against the surface of said shaft for controlling movement of said housing with respect to said shaft as said shaft is rotated with respect to said housing, a longitudinally movable plate, said plate being connected to each of said wheels so that movement of said plate longitudinally changes the pitch of said wheels with respect to said shaft.

10. The invention of claim 9 wherein said housing further includes a longitudinally extending projection which includes said longitudinal bore, said plate having a central opening through which said projection extends, and said wheels each having lever members, said lever member of each wheel being connected to said plate by a pivotable linking member and an elongated bar.

* * * * *

UNITED STATES PATENT OFFICE

CERTIFICATE OF CORRECTION

Patent No. 3,638,504　　　　　　Dated February 1, 1972

Wenzel Zaruba

It is certified that errors appear in the above-identified patent and that said Letters Patent is hereby corrected as shown below:

(1) Column 1, line 12 "forth" should be --for the--.

(2) Column 2, line 21 "hereof" should be --thereof--.

(3) Column 2, line 71 "in" should be --us--.

(4) Column 3, line 46 "and", second occurrence, should read --in--.

(5) Column 4, line 62 "housing" should be --projection--.

(6) Column 5, line 6 "he" should be --the--.

(7) Claim 1, line 37 after "wheels" insert the word --mounted--.

(8) Claim 6, line 9 "bare" should be --bars--.

(9) Claim 8, line 5 "for" should be --fork--.

Signed and sealed this 4th day of July 1972.

(SEAL)
Attest:

EDWARD M. FLETCHER, JR.　　　　　　ROBERT GOTTSCHALK
Attesting Officer　　　　　　　　　　Commissioner of Patents